United States Patent

Bain et al.

[11] Patent Number: 5,224,555
[45] Date of Patent: Jul. 6, 1993

[54] WEAR ELEMENT FOR A SCRAPING OPERATION

[75] Inventors: Roy L. Bain, Yucaipa, Calif.; Roger A. Salway, Portland, Oreg.

[73] Assignee: Bucyrus Blades, Inc., Bucyrus, Ohio

[21] Appl. No.: 808,886

[22] Filed: Dec. 18, 1991

[51] Int. Cl.$^5$ .......................... A01B 15/02; E02F 9/28
[52] U.S. Cl. .................................. 172/772.5; 37/453;
172/719; 172/701.3
[58] Field of Search ................ 172/772, 772.5, 701.3, 172/701.2, 719, 747; 37/141 R, 142 R

[56] References Cited

U.S. PATENT DOCUMENTS

| | | |
|---|---|---|
| D. 308,683 | 6/1990 | Meyers . |
| D. 308,684 | 6/1990 | Meyers . |
| 1,633,057 | 6/1927 | Wold . |
| 1,922,917 | 8/1930 | Russel et al. . |
| 2,285,039 | 6/1942 | Lowe ............................. 172/719 |
| 3,387,668 | 6/1968 | Mathers ........................ 172/719 |
| 3,465,833 | 9/1969 | Lutz .............................. 37/141 R |
| 3,497,973 | 3/1970 | Campbell ...................... 172/719 |
| 3,519,309 | 7/1970 | Engle et al. . |
| 3,529,677 | 9/1970 | Stephenson . |
| 3,685,177 | 8/1972 | Hahn et al. ................... 37/141 R |
| 3,845,578 | 11/1974 | Holmstrom .................. 37/141 R |
| 3,882,594 | 5/1975 | Jackson et al. . |
| 3,888,027 | 6/1975 | Toews . |
| 3,934,654 | 1/1976 | Stephenson et al. . |
| 3,970,445 | 7/1976 | Gale et al. ..................... 172/719 |
| 3,971,323 | 7/1976 | Beiswenger . |
| 3,984,910 | 10/1976 | Helton et al. . |
| 3,995,384 | 12/1976 | Wood ............................ 37/141 R |
| 4,011,051 | 3/1977 | Helton et al. ................. 172/719 |
| 4,052,802 | 10/1977 | Moen et al. . |
| 4,086,966 | 5/1978 | Lanz et al. . |
| 4,098,013 | 7/1978 | Hemphill ..................... 172/719 |
| 4,127,952 | 12/1978 | Chamberlain ................ 37/141 R |
| 4,194,790 | 3/1980 | Kenney et al. . |
| 4,290,214 | 9/1981 | Stepe ........................... 172/701.2 |
| 4,359,335 | 11/1982 | Garner . |
| 4,449,309 | 5/1984 | Hemphill ...................... 37/141 R |
| 4,501,079 | 2/1985 | Hahn et al. ................... 172/701.3 |
| 4,753,299 | 6/1988 | Meyers . |
| 4,770,253 | 9/1988 | Hallissy et al. . |
| 4,941,711 | 7/1990 | Stiffler ............................ 172/745 |
| 4,956,012 | 9/1990 | Jacobs et al. . |
| 5,088,214 | 2/1992 | Jones ........................... 172/772.5 |
| 5,119,888 | 6/1992 | Hall ............................. 172/772.5 |

FOREIGN PATENT DOCUMENTS

| | | |
|---|---|---|
| 306308 | 6/1955 | Fed. Rep. of Germany . |
| 2423963 | 12/1974 | Fed. Rep. of Germany . |
| 2617669 | 1/1989 | France ........................... 172/719 |
| 283914 | 4/1971 | U.S.S.R. . |

OTHER PUBLICATIONS

Sandvik Rock Tools Brochure.
Boundary Bulletin.
Caterpillar ® Advertisement for GraderBit System, 1991.
CPL, Inc. Advertisement for Kennametal Replaceable Tooth Product.
Razerco Mining Supplies Advertisement for Razor Blade System.
Kennametal Inc., Kengard A grader blades, 4 pages, B83-145 and B84-19(5)A4 effective Aug. 1983.

Primary Examiner—Randolph A. Reese
Assistant Examiner—Spencer Warnick
Attorney, Agent, or Firm—Banner, Birch, McKie & Beckett

[57] ABSTRACT

A wear insert for protecting a working element operating in an abrasive environment comprises a pair of spaced apart legs which define a gap for receiving a mounting flange of the protected working element. The wear element wraps around the mounting flange and interlocks with cooperative flanges of the working element to securely hold the insert to the working element.

36 Claims, 2 Drawing Sheets

WEAR ELEMENT FOR A SCRAPING OPERATION

FIELD OF THE INVENTION

The present invention pertains to wear inserts. More specifically, the present inserts are particularly adapted for use in earth and road working machines, such as graders, scrapers, snow plows and the like.

BACKGROUND OF THE INVENTION

Earth and road working machines, such as graders, are used primarily to maintain or create a desired ground surface. The operation is typically accomplished by a machine having a mold board or like construction. A mold board is a long scoop-like member having a slight concave surface facing in the direction of travel. The mold board is pushed across the ground or road by the machine to perform a scraping-grading type action. As can be appreciated, such an operation subjects the mold board to harsh treatment, and left unchecked would quickly ruin the mold board. To avoid premature wearing of the mold board, a wear element is secured along the mold board's lower edge.

One common wear element used to protect mold boards is an elongate blade member. The blade members are generally fabricated in three and four foot long increments and bolted end-to-end across the entire lower edge of the mold board. With this construction, the blade forms a continuous working edge which engages the ground surface and protects the mold board. An example of such a blade is disclosed in U.S. Pat. No. 4,770,253 to Hallissy et al. After a certain length of time, the worn blades are replaced instead of the much more costly mold board.

Another common wear element used to protect mold boards involves a modified form of the blade and a plurality of picks. More specifically, the modified blade member is secured to the lower edge of the mold board. Like the wear blades discussed above, these blades are fabricated in three and four foot long increments and positioned end-to-end across the mold board. However, instead of a lower working edge, the blade defines means for securing the picks. The picks are generally bolted to the face of the blade or releasably retained (e.g., by a clip) within a socket defined in the blade. In any event, a plurality of the picks are secured in place along the blade to collectively form a discontinuous working edge for engaging the ground surface. Each pick defines a generally linear edge comprising a segment of the working edge. One example of such a wear element is disclosed in U.S. Pat. No. 4,753,299 to Meyers. In this construction, only the picks generally require replacement. Alternatively, the discontinuous edge can also be formed by a specially configured blade member, such as shown in U.S. Pat. No. 3,192,653 to Socin.

In order to increase the useful life of the wear element, its working edge is often provided with a hardened insert. The insert forms the leading face and at times the bottom face, to maximize the protection afforded the wear element. The inserts are generally brazed to the wear element along one or two mounting faces. The inserts, however, are at times broken off from the wear element. Once the insert is lost, the wear element is quickly worn away and ruined. This results not only in higher maintenance and repair costs, but also increased down time for the machine.

SUMMARY OF THE INVENTION

The present invention is directed to wear inserts which protect and lengthen the useful life of an element subjected to abrasive conditions. The inserts of the present invention have particular usefulness in earth and road working machines, such as graders, scrapers and snow plows. Nonetheless, the present inserts could be used in other abrasive environments.

The present wear insert is formed with a general U-shaped configuration which defines a pair of opposed legs and a central gap therebetween. The gap enables the insert to wrap around a mounting flange of the protected element to greatly reduce the risk of breaking the insert from the element. Preferably, the insert includes six discrete mounting faces which are each fixed to the working element to preclude its unintended removal. Moreover, selected corners of the insert are chamfered to facilitate the flow of a brazing flux across all the mounting faces during fabrication.

DETAILED DESCRIPTION OF THE PREFERRED EMBODIMENTS

Figure 1:
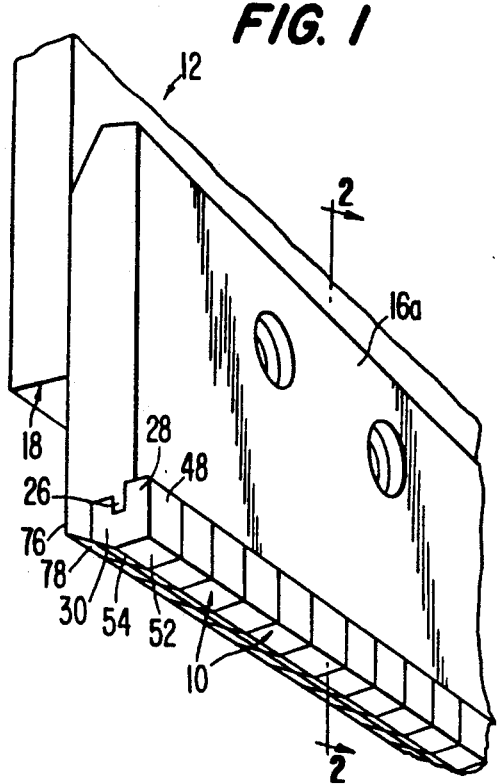
FIG. 1 is a perspective view of a grader blade assembly including the present invention.
Figure 3:
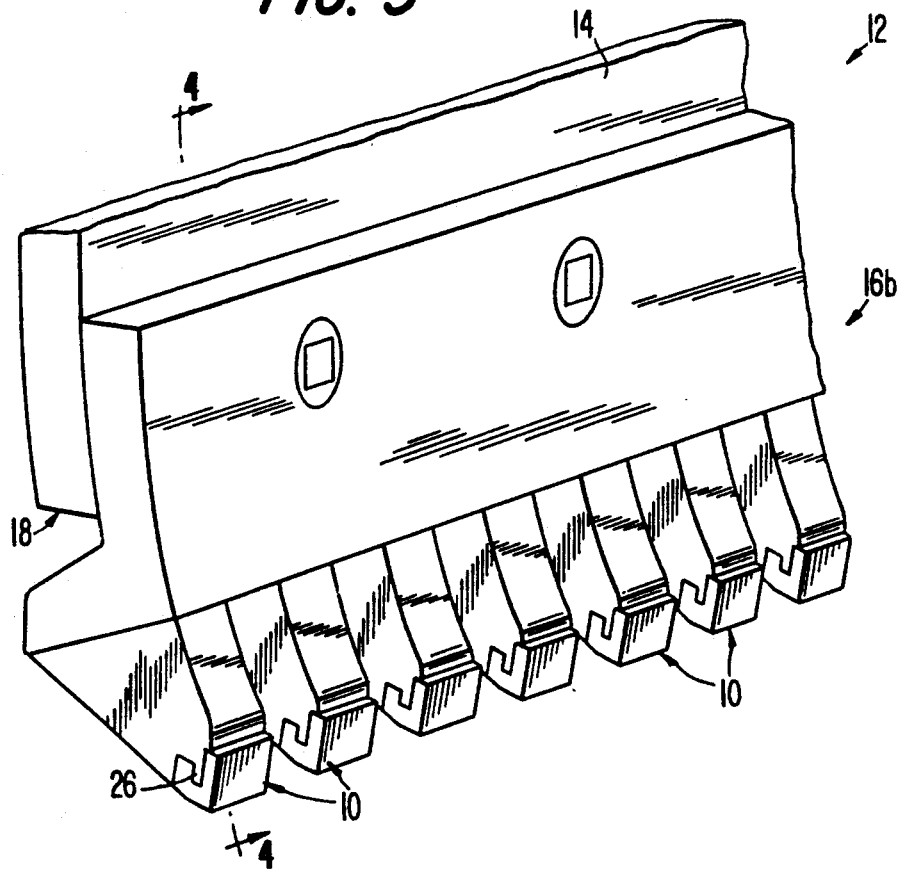
FIG. 3 is a perspective view of an alternative grader blade assembly including the present invention.

Wear insert 10 (FIGS. 6 and 7), in accordance with the present invention, is adapted to form a protective barrier for the member to which it is attached. In the preferred construction, wear inserts 10 are fixed to the lower edge of mold board assemblies 12 (FIGS. 1 and 3), such as used in graders, scrapers, snow plows and the like. Assemblies 12 generally comprise a mold board 14 and a plurality of wear elements 16. Wear element 16 may be an elongated blade member 16a, or a blade and pick construction 16b. The elongate blade member 16a and the blade and pick construction 16b operate in essentially the same way as in the prior art devices. Wear elements 16 are secured along the lower edge 18 of the mold board, so that they engage and work the ground or road surface and thereby protect the mold board. Since the wear elements 16 are subjected to abrasive conditions, they are equipped with wear inserts 10 to maximize their useful life.

Wear insert 10 has a generally U-shaped configuration which is designed to wrap around a mounting flange 26 of the protected member 16 to reliably hold the insert in place (FIGS. 1-4). More specifically, insert 10 is comprised of a front leg 28, a rear leg 30 and a lower bight segment 32 (FIGS. 2 and 4-7). The spaced apart legs 28, 30 include inner walls 34, 36, respectively, to cooperatively define a central gap 38 therebetween. The inner boundary of gap 38 is defined by end wall 40. These three walls define three independent mounting surfaces which, as discussed below, are fixed to corresponding surfaces defined by the wear element 16. Additional mounting surfaces are defined by top wall 42 of front leg 28 and the top and rear walls 44, 46 of rear leg 30.

Insert 10 further defines a generally upright leading surface 48 which faces in the direction of movement when the insert is mounted to member 16. Leading surface 48 is adapted to engage and accept the impact and other wearing forces associated with the operation. The bottom surface 50 of the insert is formed by a pair of angled segments 52, 54. Tip segment 52 extends rearwardly from leading surface 48 at about a right angle. The intersection of the leading and tip surfaces form the front leading edge 56 of the insert. The tip surface 52 is drawn along the ground or road and generally accepts wearing forces during the operation. The mold board may be oriented so that the leading surface is upright or inclined slightly in either direction. The wearing forces will vary depending on the particular operation. Sloped segment 54 is angled to slope upwardly and rearwardly from tip segment 52 at an angle of about 25° and preferably at 24° 45'. Of course, it could be oriented at other angles. Sloped surface 54 is angled relative to tip segment 52 so that it lies above the ground or road surface when the mold board is rearwardly inclined.

Figure 2:
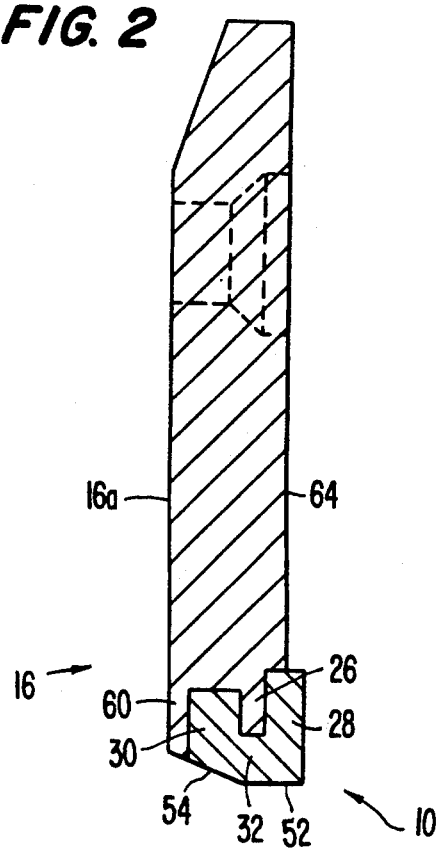
FIG. 2 is a cross sectional view taken along line 2—2 in FIG. 1.
Figure 4:
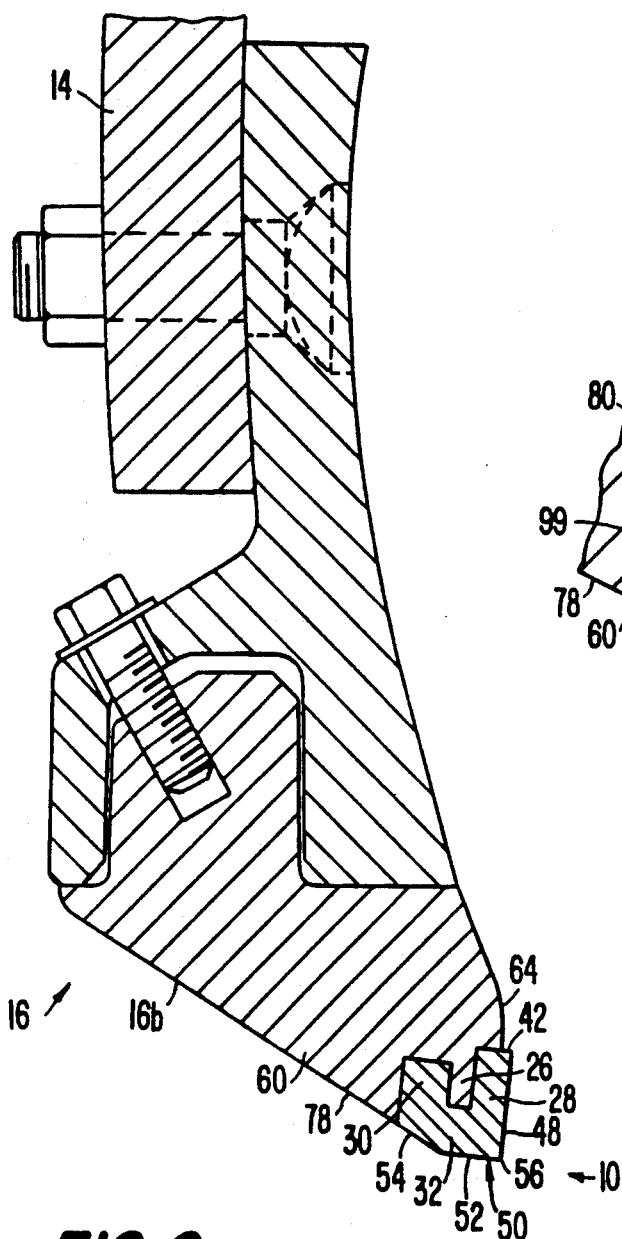
FIG. 4 is a cross sectional view taken along line 4—4 in FIG. 3.
Figure 5:
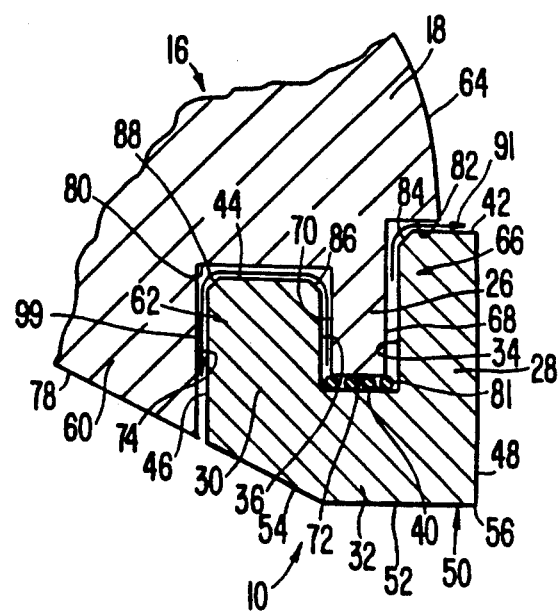
FIG. 5 is an enlarged side view of the insert and pick construction illustrating the fabrication of the present invention.

The lower working portion of the protected member 16 is specially configured to accommodate the unique construction of the present invention (FIGS. 2, 4 and 5). Specifically, member 16 defines a pair of downwardly extending flanges 26, 60. Flanges 26, 60 extend transversely across member 16 in a spaced apart relationship to define a central groove 62 therebetween. In addition, front flange 26 is offset from the front face 64 of member 16 to define a forward groove 66. Grooves 62, 66 are shaped to matingly receive therein legs 28, 30 of wear insert 10. Preferably, legs 28, 30 are fit within their respective grooves 62, 66 to accommodate the flow of a brazing solder therebetween. The interlocked relationship between the legs 28, 30 of insert 10 and flanges 26, 60 of member 16 form an enhanced mounting arrangement for the insert that significantly reduces the risk of breakage.

Front flange 26 is defined by a pair of side faces 68, 70 and an end face 72. Likewise, rear flange 60 is defined by a pair of side faces 74, 76 and an end face 78. Side faces 70 and 74 are opposed to one another. Further, side faces 70, 74 in cooperation with inner face 80 form the downwardly opening central groove 62. Side face 68 along with upper face 82 form the forward groove 66 which opens forwardly as well as downwardly. In the assembled construction, the interlocked relationship between wear insert 10 and member 16 defines six discrete pairs of opposed surfaces in close abutting relation. More specifically, with legs 28, 30 received within grooves 62, 66: top wall 42 opposes upper face 82; inner wall 34 opposes side face 68; end wall 40 opposed end face 72; inner wall 36 opposes side face 70; top wall 44 opposes inner face 80; and rear wall 46 opposes side wall 74 (FIG. 5). In the preferred construction sloped surface 54 is aligned with end face 78 in a generally planar relationship. Of course other arrangements could be used.

Figure 6:
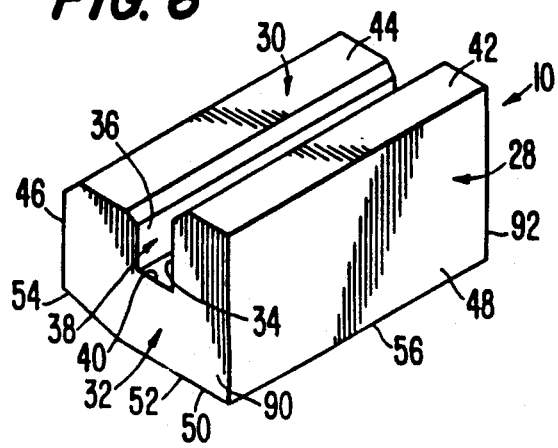
FIG. 6 is a perspective view of a wear insert in accordance with the present invention.
Figure 7:
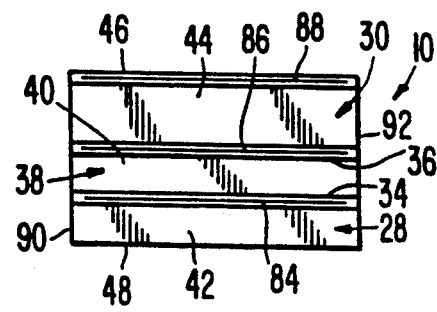
FIG. 7 is a top plan view of the wear insert.

In the preferred construction, wear insert 10 is brazed to member 16 along the six opposed surfaces noted above. In particular, the assembly is preferably fabricated by placing a plurality of solder rods 81 along end wall 40 within central gap 38 of insert 10. With the solder rods in place, insert 10 and member 16 are assembled together, as shown in FIG. 5. During the brazing process the the heated solder flows by capillary action along the opposed surfaces of insert 10 and member 16 in the directions indicated by arrows 91 and 99. Specifically, the solder flows from between end face 72 and end wall 40 and up along each side of front flange 26. In the forward direction (arrow 91), the solder flows upward between side face 68 and inner wall 34. As it reaches upper face 82, the solder flows around corner 84 and between face 82 and wall 42. In the rearward direction (arrow 99), the solder flows upward between side face 70 and inner wall 36, around corner 86, between top wall 44 and inner face 80, around corner 88 and downward between rear wall 46 and side wall 74. Preferably, the amount of solder provided permits the solder to flow to the front face 64 and inclined surface 54, but not beyond. However, an additional machining step can be employed in the event the solder seeps out from between the opposed mounting surfaces. In the preferred construction, corners 84, 86 and 88 are chamfered to ensure the free flow of the solder over all of the mounting surfaces. This interlocked construction in combination with the six discrete pairs of fixed mounting faces provides a durable construction for increased reliability. For additional security and integrity of the construction, the adjacent inserts are brazed together along their abutting sides 90, 92 (FIGS. 6 and 7).

The insert is preferably composed of a sintered combination of tungsten and cobalt. In particular insert 10 is comprised of a sintered hard metal composite of unsintered nodules of pre-blended hard metal powders of two different grades having distinctly different properties from one another. One grade has a high hardness characteristic to withstand impact forces. The other grade has a high toughness characteristic to withstand wearing forces. The composite substance possesses greater hardness and toughness characteristics than the average of the two grades considered separately. The specific fabrication and composition of the preferred material is disclosed in U.S. Pat. No. 4,956,012 to Jacobs which is incorporated by reference herein. The specially sintered composite is particularly well suited for the fabrication of inserts 10. During use of the inserts, leading face 48 primarily experiences impact forces whereas tip surface 52 primarily experiences wear forces. The preferred composite offers a beneficial compromise between toughness and hardness. Nevertheless, a variety of different materials could be used in the fabrication of wear inserts 10.

The above discussed structures and operations are merely preferred embodiments of the present invention. Various changes can be made without departing from the spirit and scope of the invention, as set forth in the claims.

We claim:

1. A blade assembly for use with a mold board comprising:
   a working element, said working element including means for attaching said working element to the mold board such that said working element extends downward therefrom to work a work surface in a general scraping operation, said working element further including a lower end having a pair of spaced apart, generally parallel flanges defining a fully open recess therebetween;
   a wear insert mounted to said working element for engaging the work surface during the scraping operation, said wear insert having a body of a certain width and a pair of spaced apart, generally parallel legs projecting from said body and extending continuously across the width of said body, said legs defining a fully open gap therebetween, said wear insert further including a front wear surface lying in a plane substantially parallel to the projection of said legs and a lower wear surface oriented at an angle to said front wear surface, said front and lower wear surfaces engage said work surface during the scraping operation to thereby protect said working element from wearing caused by the scraping operation, one of said legs of said wear insert being matingly received into said recess of said working element and one of said flanges of said working element being matingly received into said gap of said wear working element being matingly received into said gap of said wear insert such that said wear insert and said working element are interfitted with one another; and a brazing compound provided within said recess of said working element and said gap of said wear insert to fixedly bond said leg in said recess and said flange in said gap.

2. A blade assembly in accordance with claim 1, in which said wear insert includes at least six discrete mounting faces and said working element includes at least six corresponding mounting walls, wherein each said mounting face is placed in a close opposed relationship with one of said mounting walls, and wherein said brazing compound is provided between each opposed mounting face and mounting wall to fix the two together and thereby securely hold said wear insert on said working element.

3. A blade assembly in accordance with claim 1, wherein said front wear surface defines a leading surface of one of said legs.

4. A blade assembly in accordance with claim 3, wherein said lower wear surface defines a bottom surface of said body.

5. A blade assembly in accordance with claim 1, in which said working element further includes a front surface which is offset from a front wall of one of said flanges to thereby form an additional recess, wherein the other of said legs of said wear insert is received into said additional recess.

6. A blade assembly in accordance with claim 5, in which said wear insert further includes a multi-faceted, continuous mounting surface defined by a mounting face on each of said legs within said gap, a mounting face on each of said legs outside of said gap, a mounting face on a rear surface of said one leg received in said first-noted recess, and a mounting face on said body within said gap, and in which said brazing compound bonds each of said mounting faces to a corresponding surface on said working element.

7. A blade assembly in accordance with claim 6, in which said wear insert further includes chamfered corners between a plurality of adjacent mounting faces to permit said brazing compound to freely flow across the entire mounting surface whereby a secure bonding of the entire mounting surface to said working element is ensured and to provide additional angularly oriented mounting faces.

8. A blade assembly in accordance with claim 1, in which said one leg received in said recess has a depth defined between a front wall and a rear wall, said depth extending in a direction perpendicular to said front wear surface, in which said one leg further has a proximate end adjacent said body and a free end remote from said body, and in which said front and rear walls of said one leg are substantially planar from said proximate end to said remote end.

9. A blade assembly adapted for mounting to a mold board including:

a working element including means for attaching said working element to a lower end of said mold board and a pair of flanges, said flanges being spaced apart to define a recess therebetween;

at least one wear insert attached to said working element to protect said element from wearing, said wear insert having a certain width and including a body and a pair of legs extending continuously across the width of said wear insert, said legs being spaced apart from each other to define a gap therebetween, said wear insert further including at least one wear surface for engaging an abrasive work surface to protect the working element from wearing, one of said flanges of said working element being matingly received into said gap of said wear insert and one of said legs of said wear insert being matingly received into said recess of said working element such that said wear insert and said working element are interfitted with one another; and a brazing compound provided within said recess of said working element and said gap of said wear insert to fixedly attach said leg in said recess and said flange in said gap, said brazing compound forming the only means for securing the wear insert against movement away from said working element in the direction parallel to the extension of said legs.

10. A blade assembly in accordance with claim 9, in which each leg of said wear insert includes at least one mounting face within and outside of said gap, and each flange of said working element includes at least one mounting wall within and outside of said recess, wherein each said mounting face is opposed by one of said mounting walls, and said brazing compound fixedly attaches together each opposed mounting face and mounting wall.

11. A blade assembly in accordance with claim 9, in which said wear insert further includes a leading side, a bottom side, an upper side and a rear side, wherein said leading and bottom sides define wear surfaces for engaging said abrasive work surface.

12. A blade assembly in accordance with claim 11, wherein said portions of said wear insert defining said gap, said upper side and said rear side include mounting faces fixedly attached by said brazing compound to corresponding portions of said working element.

13. A blade assembly in accordance with claim 12, wherein said gap opens in said upper side.

14. A blade assembly in accordance with claim 9, wherein said wear insert is composed of a mixture of tungsten carbide and cobalt.

15. A blade assembly in accordance with claim 9, in which said wear insert is composed of a sintered hard metal composite of unsintered nodules of pre-blended hard metal powders of two different grades, wherein said grades have distinctly different properties from one another.

16. A blade assembly in accordance with claim 15, in which one of said grades exhibits a high toughness characteristic and the other of said grades exhibits a high hardness characteristic, and wherein the integrity of the two grades is maintained after sintering so that the composite exhibits the characteristics of both properties at levels higher than the average of those properties considered separately.

17. A blade assembly in accordance with claim 9 wherein said working element includes a pick attached to a mold board assembly for engaging said work surface, and wherein said wear insert is fixedly secured to said pick.

18. A blade assembly in accordance with claim 9, wherein said working element includes an elongated blade attached to said mold board and wherein said wear insert is fixedly secured to a working end thereof.

19. A blade assembly in accordance with claim 18, in which said elongated blade is a grader blade for performing a grading operation.

20. A blade assembly in accordance with claim 18, wherein said elongated blade is a scraper blade.

21. A blade assembly in accordance with claim 9, in which said working element further includes a front surface which is offset from a front wall of one of said flanges to thereby form an additional recess, wherein the other of said legs of said wear insert is received into said additional recess.

22. A blade assembly in accordance with claim 21, in which said wear insert further includes a multi-faceted, continuous mounting surface defined by a mounting face on each of said legs within said gap, a mounting face on each of said legs outside of said gap, a mounting face on a rear surface of said one leg received in said first-noted recess, and a mounting face on said body within said gap, and in which said brazing compound bonds each of said mounting faces to a corresponding surface on said working element.

23. A blade assembly in accordance with claim 22, in which said wear insert further includes chamfered corners between a plurality of adjacent mounting faces to permit said brazing compound to freely flow across the entire mounting surface whereby a secure bonding of the entire mounting surface to said working element is ensured and to provide additional angularly oriented mounting faces.

24. A blade assembly in accordance with claim 9, in which said wear surface is formed on a leading side of said wear insert, in which said one leg received in said recess has a depth defined between a front wall and a rear wall, said depth extending in a direction perpendicular to said front wear surface, in which said one leg further has a proximate end adjacent said body and a free end remote from said body, and in which said front and rear walls of said one leg are substantially planar from said proximate end to said remote end.

25. A wear insert for use with a blade assembly in a general scraping operation to protect the blade assembly from wearing, said wear insert having an upper side, a front side, a bottom side, a rear side and a certain width, said wear insert further including a body, a front leg and a rear leg, said body and said front and rear legs extending completely across said width of said wear insert, said legs projecting from said body in a generally parallel relationship and being spaced apart to define a fully open gap therebetween, at least one of said legs of said wear insert having a proximate end adjacent said body and a free end remote from said body, said at least one leg having a depth defined between a front wall and a rear wall, said depth extending in a direction perpendicular to said front side of said wear insert, said front and rear walls of said at least one leg being substantially planar from said proximate end to said remote end, said wear insert further including a multi-faceted, continuous mounting surface extending over said upper and rear sides, said mounting surface being adapted for bonding to corresponding surfaces on said working element, said mounting surface being defined by a mounting face on each leg within said gap, a mounting face on each said leg outside of said gap, a mounting face on said body within said gap, and a mounting face on one of said legs along said rear side of said wear insert, said front side defining a leading surface lying in a plane substantially parallel with the projection of said legs, said leading surface being adapted to engage an abrasive material during the scraping operation to protect the blade assembly from wearing.

26. A wear insert in accordance with claim 25, in which said bottom side defines a first substantially planar segment adjacent said leading surface and a second substantially planar segment adjacent said rear side, said first segment being adapted to engage the abrasive material during the scraping operation, said second segment being inclined upwardly from said first segment at an angle sufficient to provide ample clearance to permit the blade assembly to be suitably rotated during use.

27. A wear insert in accordance with claim 25, in which said gap is defined in part by said rear wall of said one leg and a forward wall of the other leg, wherein said forward wall and said rear wall are opposed to one another and in which said forward wall and said rear wall are substantially planar from said body to said upper side.

28. A wear insert in accordance with claim 25, wherein said bottom side defines a wear surface adapted to engage the abrasive material to protect the blade assembly.

29. A wear insert in accordance with claim 25, further including chamfered corners between each adjacent mounting face to enable brazing material fixing said wear insert to the working element to freely flow across each of the mounting faces during the brazing process and to provide additional angularly oriented faces for holding said wear insert.

30. A wear insert in accordance with claim 25, wherein said wear insert is composed of a mixture of tungsten carbide and cobalt.

31. A wear insert in accordance with claim 25, in which said wear insert is composed of a sintered hard metal composite of unsintered nodules of pre-blended hard metal powders of two different grades, wherein said grades have distinctly different properties from one another.

32. A wear insert in accordance with claim 31, in which one of said grades exhibits a high toughness characteristic and the other of said grades exhibits a high hardness characteristic, and wherein the integrity of the two grades is maintained after sintering so that the composite exhibits the characteristics of both properties at levels higher than the average of those properties.

33. A wear insert for use on a blade assembly to protect the blade assembly during a general scraping operation, said wear insert having an upper side, a front side, a bottom side, a rear side and a pair of sidewalls, the distance between said sidewalls defining a width of said wear insert, said wear insert including a fully open gap in a medial portion thereof, said gap being open to said upper side and said sidewalls, said wear insert further defining a multi-faceted, continuous mounting surface extending across said upper side, said gap and said rear side, said mounting surface being defined by a series of discrete mounting faces arranged seriatim on a portion of said upper side adjacent one side of the opening of said gap, on a plurality of walls defining said gap, on a portion of said upper side on the other side of the opening of said gap, and on said rear side, each said mounting face extending continuously across the width of said wear insert, said mounting faces being adapted for bonding to corresponding surfaces of the blade assembly to securely hold said wear insert to the blade assembly, said front side including a leading wear surface and said bottom side including a lower wear surface, said leading and lower wear surfaces being adapted to engage an abrasive material during the scraping operation.

34. A wear insert in accordance with claim 33, further including chamfered corners between a plurality of adjacent mounting faces to permit a brazing compound bonding said mounting faces to the blade assembly to freely flow across the entire mounting surface and to provide additional angularly oriented mounting faces to hold the wear insert in place.

35. A wear insert in accordance with claim 33, in which said gap is defined in part by a front wall and a rear wall, wherein said front and rear walls are opposed to one another and extend between said sidewalls, and wherein the front and rear walls are substantially planar over the entire depth of the gap.

36. A wear insert in accordance with claim 33, in which said bottom side includes a first substantially planar segment adjacent the leading wear surface and a second substantially planar segment adjacent the rear side, said first segment including said lower wear surface, said second segment is inclined upwardly from said first segment at an angle sufficient to provide ample clearance to permit the blade assembly to be suitably rotated during use.

* * * * *

UNITED STATES PATENT AND TRADEMARK OFFICE
CERTIFICATE OF CORRECTION

PATENT NO. : 5,224,555
DATED : July 6, 1993
INVENTOR(S) : Roy L. Bain et al.

It is certified that error appears in the above-indentified patent and that said Letters Patent is hereby corrected as shown below:

Column 5, lines 16 and 17, the phrase "working element being matingly received into said gap of said wear"

should be deleted.

Signed and Sealed this

Eleventh Day of June, 1996

*Attest:*

BRUCE LEHMAN

*Attesting Officer*  *Commissioner of Patents and Trademarks*